2,844,590
4-ALKYLIDENE-2-OXAZOLIDONES AND PROCESS

Margaret D. Cameron, Dayton, Ohio, assignor to Monsanto Chemical Company, St. Louis, Mo., a corporation of Delaware No Drawing. Application October 1, 1956
Serial No. 612,975

17 Claims. (Cl. 260—307)

This invention relates to azlactones and more particularly provides novel oxazolidinones and a new method of synthesis of such compounds.

By azlactones are herein meant cyclic compounds containing the

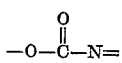

structure which are simultaneously lactones and lactams. I have now made the discovery that azlactones of the oxazolidinone series are readily prepared by the cyclization of alkynyl carbamates as illustrated by the following equation:

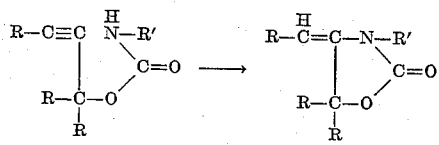

where each R represents hydrogen or a hydrogen radical and R' represents hydrogen, a hydrocarbon radical or a halohydrocarbon radical.

The present cyclization reaction whereby 4-alkylidene-2-oxazolidinones are prepared is highly surprising, since such cyclization of an acetylenic compound has not been known previously, nor have I have able to cyclize α,β-olefinic carbamates such as allyl carbanilate. It is particularly unexpected that the resultant compound should be a five-membered ring with an exocyclic double bond, for cyclizations of acetylenic compounds which have previously been reported have given ring compounds wherein the acetylenic triple bond becomes an endocyclic double bond, the terminal acetylenic carbon atom being incorporated into the ring system. It would, accordingly, be expected that the present reaction would give a six-membered unsaturated ring system, but I have carried out a structure proof which disproves this expectation.

My structure proof is outined by the following set of equations:

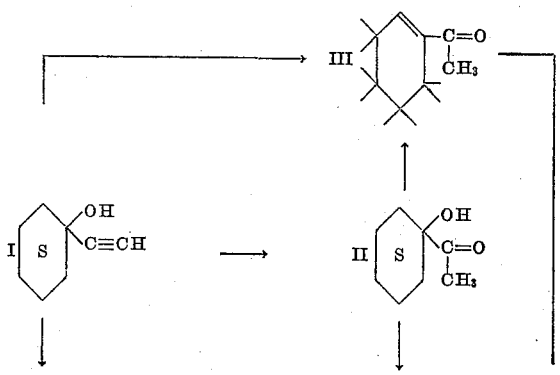

Thus, 1-ethynylcyclohexanol (I) is hydrated to 1-acetylcyclohexanol (II), a known compound. The carbanilate of I, having the structure IV, is identified as the acetylenic carbanilate by the infrared spectrum, showing the presence of an acetylenic triple bond. The carbanilate of II, which is V, is free of acetylenic unsaturation and contains a carbonyl group. When each of IV and V is heated in the presence of a base, the identical compound, VI, is obtained. The formation of VI from IV represents the novel synthesis of this invention as outlined above. The formation of VI from V must proceed by a route analogous to the prior art syntheses of oxazolinones from the carbamates of α-keto alcohols:

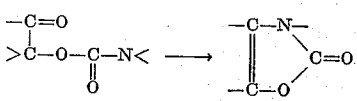

In the present instance, in compound V the keto carbon atom is unable to form a double bond with the carbinol carbon atom, because three bonds of this cyclohexanol carbon atom are already fixed:

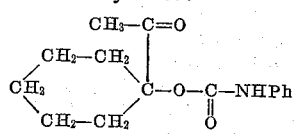

An imino double bond cannot be formed, for two bonds of the nitrogen atom are already fixed by attachment to carbon atoms, and in any case, the properties and characteristics of the product are not those of an imino compound. Accordingly, the olefinic unsaturation in the cyclic compound obtained, the presence of which is evidenced by the spectra of the compounds, must be exocyclic.

As proved by mixed melting points and comparison of infrared spectra, identical compound VI is obtained from compound IV and from compound V. The identity of compound VI as prepared by the two different syntheses is further proved by the conversion of samples thereof prepared via each route to the dinitrophenylhydrazone of III, a known compound.

To the best of my knowledge, the 4-alkylidene-2-oxazolidinones provided by this invention are novel compounds which have not been known hitherto. This class of compounds is of utility as intermediates in the synthesis of 2-oxazolidinones which contain an aliphatically saturated substituents in the 4 position; the conversion of the present compounds to such oxazolidinones may be readily accomplished by catalytic hydrogenation. The 2-oxazolidinones wherein an aliphatically saturated substituent is present on the 4 position, are a known class of compounds having physiological, e. g., anticonvulsant activity, and also useful for such applications as plasticizers and solvents for nitrogen-containing polymers such as polyacrylonitrile.

Any of a wide variety of esters of acetylenic alcohols with carbamic acids may be employed in the present process for producing 4-alkylidene-2-oxazolidinones. So far as I am presently aware, it is necessary only that the ester be $\alpha,\beta$-acetylenically unsaturated and that a hydrogen atom should be attached to the nitrogen atom, from which it migrates during ring closure to the ester acetylenic $\beta$-carbon atom. The other substituents on the nitrogen atom and on the ester carbon atoms may be hydrogen, or may be hydrocarbon radicals or hydrocarbon radicals substituted by negative substituents such as chlorine or bromine. In the preferred embodiment of this invention, each R substituent on the ester carbon atoms, as identified in the above illustrated general equation of the reaction of the invention, is hydrogen or a hydrocarbon radical containing up to 16 carbon atoms, and the substituent R′ on the nitrogen atom of the molecule is hydrogen or is a hydrocarbon radical containing up to 16 carbon atoms and substituted by from 0 to 5 halogen atoms having an atomic weight of from 30 to 100, i. e., chlorine or bromine. Such esters may readily be prepared by the reaction of the appropriate $\alpha,\beta$-acetylenically unsaturated alcohol with urea, whereby esters of carbamic acid are obtained, or with a carbamyl chloride or isocyanate, whereby there are obtained carbamate esters wherein the nitrogen atom of the molecule carries a single hydrogen atom as one substituent thereof.

One class of the presently useful esters are those wherein each R and R′ in the formula of the presently useful starting materials is hydrogen or an aliphatic hydrocarbon radical. When R′ and each R is hydrogen, the above formula represents 2-propynyl carbamate. Other presently useful esters of carbamic acid, of the formula $H_2NCOOCR_2C \equiv CR$ where each R represents hydrogen or an alkyl radical, are e. g., esters of primary acetylenic alcohols such as 2-butynyl carbamate, 2-pentynyl carbamate, 2-isopentynyl carbamate, 2-heptynyl carbamate, 4,4-dimethyl-2-pentynyl carbamate, 2-octynyl carbamate, 2-tridecynyl carbamate, 2-hexadecynyl carbamate, etc. Similarly, there may be utilized the carbamic acid esters of secondary acetylenic alcohols, such as 1-methyl-2-propynyl carbamate, 1-ethyl-2-propynyl carbamate, 1-isopropyl-2-propynyl carbamate, 1-ethynyloctyl carbamate, etc.; and of tertiary acetylenic alcohols such as 1,1-dimethyl-2-propynyl carbamate, 1,1-dipropyl-2-propynyl carbamate, 1 - methyl-1-ethyl - 2 - propynyl carbamate, 1 - methyl-1-propyl-2-propynyl carbamate, 1 - ethynyl-1-methylpentyl carbamate, etc. I have further found that olefinic double bonds and acetylenic triple bonds which are not located alpha to the carbinol carbon atom of the acetylenic alcohol used to form the presently useful carbamates are not susceptible to the present cyclization reaction at temperatures at which cyclization of the presently useful esters occurs.

Accordingly, such unsaturation does not interfere in the present synthesis of cyclized compounds. Exemplary of $\alpha,\beta$-acetylenically unsaturated esters containing additional aliphatic unsaturation and useful in the process of the invention are alkenyl- and alkynyl-substituted $\alpha,\beta$-acetylenically unsaturated esters of carbamic acid, such as 4-penten-2-ynyl carbamate, 1-vinyl-2-propynyl carbamate, 1-ethynyl-2-butenyl carbamate, 1-methyl-2-pentyn-4-enyl carbamate, 1-ethynyl-2-methyl-2-propenyl carbamate, 1,1-dimethyl-2-pentyn-4-enyl carbamate, 1-(2-propenyl)-4-methyl-2-hexyn-4-enyl carbamate, 2,4-hexadiynyl carbamate, etc.

Another class of presently useful carbamates which may be cyclized to 4-alkylidene-2-oxazolidinones in accordance with the process of this invention includes the esters of carbamic acid of the above formula, wherein the substituents on the carbon atom directly attached to the ester oxygen, taken together with the carbon atom to which they are attached, form a cycloalkyl radical, preferably containing from 5 to 10 carbon atoms, wherein the alicyclic nucleus of the cycloalkyl radical is a 5- to 7-membered ring. One such carbamate is 1-ethynylcyclohexyl carbamate of the formula

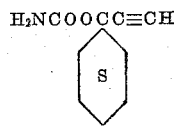

which is presently an article of commerce. Other 1-alkynylcycloalkyl carbamates which may be cyclized in accordance with the process of this invention include 1 - ethynylcyclopentyl carbamate, 1 - ethynylcycloheptyl carbamate, 1-ethynyl-4-methylcyclohexyl carbamate, 1-ethynyl-3,3,5-trimethylcyclohexyl carbamate, 1-ethynyl-2,2-dimethylcyclopentyl carbamate, 1-ethynyl-4-isobutylcyclohexyl carbamate, 1-(1-propynyl)cyclohexyl carbamate, 1-(1-butyn-3-enyl)cyclohexyl carbamate, 1-(1-propynyl)-3-methylcyclohexyl carbamate, etc.

A third class of presently useful carbamates are those wherein one of the substituents on the acetylenic ester radical is a cyclic radical extrinsic to the carbinol carbon atom, i. e., a cycloalkyl or aromatic radical. Examples of such carbamates are 3-phenyl-2-propynyl carbamate, 1-phenyl-2-propynyl carbamate, 1-phenyl-2-butynyl carbamate, 1-methyl-3-phenyl-2-propynyl carbamate, 1-methyl-1-phenyl-2-propynyl carbamate, 4-cyclohexyl-2-butynyl carbamate, 1-cyclohexyl-2-butynyl carbamate, 3-cyclohexyl-1-methyl-2-propynyl carbamate, etc.

In addition to the above-listed carbamates, the $\alpha,\beta$-acetylenically unsaturated esters of carbamic acids wherein one substituent is present on the carbamic acid nitrogen atom may also be cyclized by the process of this invention. The radical substituted on the carbamic acid nitrogen atom in the preferred embodiment of this invention is a hydrocarbon radical containing up to 16 carbon atoms and from 0 to 5 halogen atoms, having an atomic weight of from 30 to 100. One class of such esters of carbamic acids are the alkylcarbamate esters, which are readily available by the reaction of an alkyl isocyanate with an acetylenic alcohol. Exemplary of the presently useful alkylcarbamate esters with aliphatic acyclic acetylenic alcohols are 2-propynyl methylcarbamate, 2-propynyl ethylcarbamate, 2-propynyl n-propylcarbamate, 2-propynyl n-butylcarbamate, 2-propynyl octylcarbamate, 2-propynyl 4,4-dimethyloctylcarbamate, 2-propynyl octadecylcarbamate, 1-methyl-2-propynyl ethylcarbamate, 2-butynyl butylcarbamate, 2-pentyn-4-enyl decylcarbamate, 1-vinyl-2-propynyl ethylcarbamate, 1,1-dimethyl-2- decynyl butylcarbamate, etc. Alkynylcycloalkyl esters of alkylcarbamic acids which may be cyclized in accordance with the process of this invention include, e. g., 1-ethynylcyclohexyl butylcarbamate, 1-ethynyl-4-methylcyclohexyl octylcarbamate, 1-(1-propynyl)-3,3,5-trimethylcyclohexyl dodecylcarbamate, etc. Also available as starting materials for the process of this invention are the esters of alkylcarbamic acids with other acetylenic alcohols containing cyclic substituents, such as 1-phenyl-2-propynyl carbamate, 3-phenyl-2-propynyl carbamate, 4-cyclopentyl-2-butynyl ethylcarbamate, 1-benzyl-2-propynyl butylcarbamate, 1 - methyl-3-cyclohexyl-2-propynyl dodecylcarbamate, 1-p-tolyl-2-propynyl butylcarbamate, 1-phenyl- 4-methyl-2-butynyl hexylcarbamate, 1,1-diphenyl-2-pentyn-4-enyl hexylcarbamate, etc. Also contemplated by this invention as starting materials for oxazolidinone synthesis are the acetylenic esters of aliphatically substituted carbamates wherein the radical attached to the nitrogen atom contains aliphatic unsaturation, where these are available. Examples of such esters are 2-propynyl 4-decenylcarbamate, 1-methyl-1-phenyl-2-propynyl 9-decenylcarbamate, 1-ethynylcyclohexyl 3-butynylcarbamate, etc.

A further embodiment of the process of this invention, which is particularly preferred, comprises the cyclization of carbanilates and other aromatic carbamic acid esters of α,β-acetylenically unsaturated alcohols. The class of cyclizable carbanilates useful in the present process is represented by the carbanilates of aliphatic alkynols such as the carbanilates of primary acetylenic alcohols, e. g., 2-propynyl carbanilate, 2-pentynyl carbanilate, 2-tridecynyl carbanilate; of secondary alcohols, such as 1-methyl-2-propynyl carbanilate, 1-propyl-2-propynyl carbanilate, 1-ethynyloctyl carbanilate; and of tertiary acetylenic alcohols, such as 1,1-dimethyl-2-propynyl carbanilate, 1-methyl-1-propyl-2-propynyl carbanilate, 1-ethynyl-1-methylpentyl carbanilate, 1-butyl-1-methyl-2-pentyn-4-enyl carbanilate, etc. Equally susceptible to cyclization by the process of this invention are the 1-alkynylcycloalkyl carbanilates as provided by my copending application, Serial No. 612,978, of even date and common assignment herewith, now abandoned. Examples of such 1-alkynylcycloalkyl carbanilates are 1-ethynylcyclohexyl carbanilate, 1-(1-propynyl)cyclohexyl carbanilate, 1-(1-dodecynyl)cyclohexyl carbanilate, 1-ethynyl-4-methylcyclohexyl carbanilate, 1-ethynyl-3,3,5-trimethylcyclohexyl carbanilate, 1-(1-propynyl)-2,2-dimethylcyclopentyl carbanilate, etc. Additionally, there may be used in the present process carbanilate esters of cyclo-substituted acetylenic alcohols such as 1-phenyl-2-propynyl carbanilate, 3-phenyl-2-propynyl carbanilate, 4-cyclopentyl-2-butynyl carbanilate, 1-p-tolyl-2-propynyl carbanilate, 1-methyl-1-phenyl-2-propynyl carbanilate, 1,1-diphenyl-2-propynyl carbanilate, 1-methyl-1-phenyl-2-butynyl carbanilate, 1-phenyl-3-p-tolyl-2-propynyl carbanilate, 1-phenyl-3-naphthyl-2-propynyl carbanilate, 3-biphenylyl-2-propynyl carbanilate, etc.

The present process is not limited to the carbanilates of acetylenic alcohols, and may equally be applied to acetylenic esters of other aromatic acids. One such class of aromatic carbamates useful in the present process includes alkaryl carbamates such as ar-methylcarbanilates [where ar- indicates ring substitution, as opposed to substitution on the N atom], e. g., 2-propynyl p-methylcarbanilate, 1-ethynylcyclohexyl 2,4-dimethylcarbanilate, 1-methyl-1-phenyl-2-propynyl p-isopropylcarbanilate, etc. Other classes of carbamates containing only one hydrocarbon substituent and available for cyclization by the present process include aralkylcarbamate esters such as 2-propynyl benzylcarbamate, 1,1-dimethyl-2-propynyl diphenylmethylcarbamate, 1-(1-propynyl)cyclohexyl 2,2-diphenylpropylcarbamate, etc., and the acetylenic esters of polycyclic aromatic carbamates such as 2-propynyl naphthalenecarbamate, 2-propynyl biphenylcarbamate, 2-propynyl 5-hexyl-1-naphthalenecarbamate, etc.

Also contemplated as starting materials for the present process are the cycloalkanecarbamic acid esters of acetylenic alcohols conforming to the above formula, such as 2-propynyl cyclohexanecarbamate, 2-propynyl 4-methylcyclohexanecarbamate, 1,1-diethyl-2-propynyl cyclohexenecarbamate, etc.

In addition to the above-listed acetylenic esters with acids of the formula RNHCOOCR$_2$C≡CR where each R represents hydrogen or a hydrocarbon radical, I have discovered that the present reaction is also applicable to esters wherein the radical represented by R' contains negative substituents such as chlorine and bromine atoms and, in fact, the cyclization is particularly favored by the presence of negative substituents on the radical attached to the nitrogen atom of the carbamate ester molecule. One class of negatively-substituted esters of carbamic acids susceptible to cyclization in accordance with this invention and especially preferred in the present process are the chlorocarbanilic and bromocarbanilic acid esters of α,β-acetylenic alcohols. The acetylenic alcohol chlorocarbanilate and bromocarbanilate esters are a new class of compounds provided by my copending application, Serial No. 612,921, of even date and common assignment herewith, and are useful as biological toxicants. Such esters may be readily prepared by the reaction of a halophenyl isocyanate with an acetylenic alcohol, preferably in the presence of a basic catalyst such as pyridine.

Examples of the presently useful halocarbanilates are the halocarbanilates of aliphatic acetylenic alcohols such as 2-propynyl 2-chlorocarbanilate, 2-propynyl 3-chlorocarbanilate, 2-propynyl 4-chlorocarbanilate, 2-propynyl 3,4-dichlorocarbanilate, 2-propynyl 2,4-dichlorocarbanilate, 2-propynyl 2,4,5-trichlorocarbanilate, 2-propynyl 3,5-dibromocarbanilate, 2-propynyl pentachlorocarbanilate, 1,1-dimethyl-2-propynyl 3-chlorocarbanilate, 1-methyl-2-butynyl 3-chlorocarbanilate, 1-(1-isobutenyl)-1-methyl-2-heptynyl 3-chlorocarbanilate, etc. Another class of halocarbanilates useful in the process of the invention are the esters of 1-alkynylcycloalkyl alcohols, especially those wherein the cycloalkyl radical contains a 5- to 7-membered alicyclic ring, said cycloalkyl radical containing a total of from 5 to 10 carbon atoms. Exemplary of these esters are 1-ethynylcyclohexyl 3-chlorocarbanilate, 1-ethynylcyclohexyl 3,4-dichlorocarbanilate, 1-ethynyl-4-methylcyclohexyl 3-bromo-4-chlorocarbanilate, 1-(1-propynyl)cyclohexyl 3-chlorocarbanilate, 1-(1-dodecynyl)cyclohexyl 4-chlorocarbanilate, 1-ethynyl-3,3,5-trimethylcyclohexyl 3-chlorocarbanilate, etc. Another class of presently useful halocarbanilates are the esters of aromatically-substituted and cycloalkyl-substituted acetylenic alcohols, such as 1-phenyl-2-propynyl 3-chlorocarbanilate, 1-phenyl-1-methyl-2-propynyl 3-chlorocarbanilate, 1-phenyl-1-methyl-2-propynyl 3,4-dichlorocarbanilate, 1-phenyl-2-pentynyl 3,4-dichlorocarbanilate, 1-ethyl-3-phenyl-2-propynyl 3,4-dichlorocarbanilate, 4-cyclohexyl-1-methyl-2-butynyl pentachlorocarbanilate, etc.

Similarly, of utility as starting materials for cyclization to 4-alkylidene-2-oxazolidinones as provided by this invention are other halo-substituted carbamate esters of acetylenic alcohols such as 2-propynyl 2-chloroethylcarbamate, 2-propynyl 5-chloro-1-naphthalenecarbamate, 2-propynyl 3-chloro-4-methylcarbanilate, 2-propynyl 3-bromocarbanilate, 2-propynyl 3,4-dibromocarbanilate, 1,1-dimethyl-2-propynyl 4-bromocarbanilate, 1-ethynylcyclohexyl 5,8-dichloro-1-naphthalenecarbamate, 1-methyl-1-phenyl-2-propynyl pentachlorocarbanilate, etc.

In accordance with the present invention, the esters of carbamic acids with α,β-acetylenic alcohols of the above-illustrated formula are cyclized to form 4-alkylidene-2-oxazolidinones.

By the cyclization of esters of acetylenic alcohols with carbamic acid, there are provided 2-oxazolidinones wherein the nitrogen atom is substituted only by hydrogen. Thus, e. g., by the cyclization of 2-propynyl carbamate there is prepared 4-methylene-2-oxazolidinone of the formula

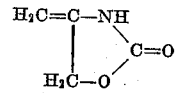

Similarly, by the cyclization of esters of carbamic acid with other primary aliphatic acetylenic alcohols containing no acetylenic hydrogen, there are prepared 4-alkylidene-2-oxazolidinones such as 4-ethylidene-2-oxazolidinone, 4-propylidene-2-oxazolidinone, 4-hexylidene-2-oxazolidinone, 4-nonylidene-2-oxazolidinone, 4- isohexadecylidene - 2 - oxazolidinone, 4 - allylidene-2-oxazolidinone, etc. Substituents on the carbinol carbon atom of esters of carbamic acid with aliphatic acetylenic alcohols produce 5-substituted 4-alkylidene-2-oxazolidinones, such as 4-methylene-5-methyl-2-oxazolidinone, 4-methylene-5-ethyl-2-oxazolidinone, 4 - methylene - 5,5-dimethyl-2-oxazolidinone, 4-methylene-5-ethyl-5-methyl-2-oxazolidinone, 4 - ethylidene-5-ethyl-5-hexyl-2-oxazolidinone, 4-methylene-5-butyl-2-oxazolidinone, 4-methylene-5-(1-methyl-2-propynyl)-2-oxazolidinone, 4 - methylene-5-decyl-2-oxazolidinone, 4-ethylidene-5-propyl-2-oxazolidinone, 4 - allylidene-5,5-dimethyl-2-oxazolidinone, etc. Similarly, by the cyclization of aromatically substituted acetylenic carbamates in accordance with this invention, there are provided 4-alkylidene-2-oxazolidinones which may be substituted by aromatic radicals on the 4 and/or 5 position, such as 4-benzylidene-2-oxazolidinone, 4-methylene-5-phenyl-2-oxazolidinone, 4 - benzylidene-5-phenyl-2-oxazolidinone, 4-ethylidene-5-phenyl-2- oxazolidinone, 4-(2-phenylethylidene)-5,5-dimethyl-2-oxazolidinone, 4-(4-biphenylylmethylidene) - 2 - oxazolidinone, 4-(p - methylbenzylidene) - 2 - oxazolidinone, 4-(2-α-naphthylethylidene)-5-propyl-2-oxazolidinone, 4-benzylidene-5-t-butyl-5-methyl-2-oxazolidinone, 4 - (2,4-dimethylbenzylidene)-5,5-di-n-propyl-2-oxazolidinone, etc. When the present cyclization process is applied to esters of carbamic acid with cycloalkyl-substituted acetylenic alcohols wherein the carbon atom adjacent to the ester oxygen atom is extrinsic to the cycloalkyl ring, there are obtained, e. g., 4-(cyclohexylmethylidene)-5,5-di-methyl-2-oxazolidinone, 4 - (2 - cyclohexylethylidene)-2-oxazolidinone, 4-(cyclohexylmethylidene) - 5 - methyl-2-oxazolidinone, 4-methylene-5-cyclohexyl-2-oxazolidinone, etc.

Similarly, when the acetylenic esters of alkylcarbamic acids, arylcarbamic acids, and other esters of acids which can be derived from the corresponding isocyanates are cyclized, there are obtained 3-substituted 4-alkylidene-2-oxazolidinones which may or may not carry substituents in the 5 position, depending on the substitution of the acetylenic alcohol portion of the ester. Thus, e. g., from 2 - propynyl methylcarbamate is obtained 3-methyl-4-methylene-2-oxazolidinone of the formula

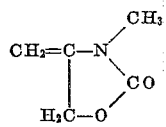

Similarly, by the cyclization of alkylcarbamate esters, there may be derived alkyl-substituted 4-alkylidene-2-oxazolidinones such as 3 - ethyl-4-methylene-2-oxazolidinone, 3,5 - dimethyl - 4-methylene-2-oxazolidinone, 3,5,5-trimethyl-4-methylene-2-oxazolidinone, 3 - ethyl - 4-ethylidene - 5,5 - dimethyl-2-oxazolidinone, 3-ethyl-4-pentylidene-5,5-dimethyl-2-oxazolidinone, 3-butyl-4-butylidene-5-ethyl - 5 - methyl-2-oxazolidinone, 3-decyl-4-methylene-2-oxazolidinone, 3-(5,5 - dimethylnonyl)-4-methylene-2-oxazolidinone, 3 - butyl - 4-methylene-5-(2-methyl-3-pentynyl) - 5-methyl-2-oxazolidinone, etc. Oxazolidinones derivable in accordance with the present invention from the esters of alkylcarbamic acids with acetylenic alcohols containing cyclic radicals are, e. g., 3-methyl-4-benzylidene-2-oxazolidinone, 3-ethyl-4-benzylidene-2-oxazolidinone, 3-ethyl-4-methylene-5-phenyl-5-methyl-2-oxazolidinone, 3 - butyl - 4 - (cyclohexylmethylidene)-2-oxazolidinone, 3 - butyl - 4 - (2-cyclohexylethylidene)-2-oxazolidinone, 3-butyl-4-(cyclohexylmethylidene)-5,5-dimethyl-2-oxazolidinone, 3 - hexyl - 4 - (cyclopentylmethylidene)-2-oxazolidinone, 3-dodecyl-4-benzylidene-2 - oxazolidinone, 3 - isopropyl - 4 - methylene - 5 - (2 - phenylvinyl) - 2 - oxazolidinone, 3 - isopentyl - 4-methylene-5,5-diphenyl-2-oxazolidinone, 3-butyl-4-ethylidene-5-phenyl-2-oxazolidinone, 3-butyl-4-benzylidene-5-hexyl-5-methyl-2-oxazolidinone, 3 - isodecyl - 4 - methylene-5-methyl-5-(2-(2,5,5-trimethyl-2-cyclohexenyl)ethyl)-2-oxazolidinone, etc.

By cyclization of α,β-acetylenically unsaturated esters of carbamic acids wherein a cyclic radical is attached to the nitrogen atom, there are obtained 4 - alkylidene - 2 - oxazolidinones bearing cyclic substituents on the 3 position. Examples of such oxazolidinone compounds derived from cycloalkanecarbamates are derivatives of aliphatic acyclic primary, secondary, and tertiary acetylenic alcohols, such as 3 - cyclohexyl-4-methylene-2-oxazolidinone, 3-cyclohexyl-4-ethylidene-2-oxazolidinone, 3-cyclohexyl - 4 - dodecylidene - 2-oxazolidinone, 3-cyclohexyl-4-methylene-5,5-dimethyl-2-oxazolidinone, 3-cyclopropyl-4-methylene-2-oxazolidinone, 3-(4-isopropyl-1-methylcyclohexyl)-4-methylene-5,5-dimethyl - 2 - oxazolidinone, 3-bicyclo[2.2.2]octyl - 4 - methylene - 2 - oxazolidinone, 3 - cyclohexenyl - 4 - propylidene - 5,5 - dimethyl - 2 - oxazolidinone, 3 - (4 - isopropyl - 1-methylcyclohexyl)-4-undecylidene-2-oxazolidinone, 3-cyclohexyl-4-methylene-5-methyl-5-propyl-2-oxazolidinone, 3 - bicyclo[2.2.1]heptenyl - 4 - (2 - methylenepropylidene) - 5 - isopropyl - 2-oxazolidinone, etc.

Another embodiment of this invention comprises the oxazolidinone compounds derived from the readily available esters of acetylenic alcohols with aromatic carbamic acids, providing 3-aryl oxazolidinones such as 3-phenyl-4-methylene-2-oxazolidinone, 3 - phenyl-4-methylene-5,5-dimethyl - 2-oxazolidinone, 3-phenyl-4-ethylidene-5-ethyl-2 - oxazolidinone, 3 - phenyl - 4 - heptylidene-5-methyl-2-oxazolidinone, 3 - phenyl - 4 - pentylidene-5,5-dimethyl-2-oxazolidinone, 3 - phenyl - 4 - propylidene - 5-isopropyl-5-methyl - 2 - oxazolidinone, 3 - phenyl-4-methylene-5,5-dipropyl-2-oxazolidinone 3-p-tolyl-4-methylene-2-oxazolidinone, 3-o-tolyl-4-ethylidene-2-oxazolidinone, 3-p-tolyl-4-methylene-5,5-dimethyl-2-oxazolidinone, 3-biphenylyl-4-methylene-2-oxazolidinone, 3 - α-naphthyl-4-methylene-2-oxazolidinone, 3 - cuminyl - 4-methylene-2-oxazolidinone, 3-benzyl-4-methylene-2-oxazolidinone, etc. Among the 4-alkylidene-2-oxazolidinones provided by this invention and derived from the esters of aromatic carbamic acids with acetylenic alcohols substituted by cyclic radicals are 3-phenyl-4-benzylidene-2-oxazolidinone, 3,5-diphenyl-4-methylene - 2 - oxazolidinone, 3-p-tolyl-4-(cyclopentylethylidene) - 2-oxazolidinone, 3,5-diphenyl-4-methylene-5 - methyl - 2 - oxazolidinone, 3-phenyl-4-(2-phenylethylidene) - 2 - oxazolidinone, 3 - α - naphthyl-4-methylene-5-phenyl - 5 - methyl - 2-oxazolidinone, 3-m-tolyl-4-benzylidene-5-methyl-2-oxazolidinone, 3 - biphenylyl - 4 - (cyclohexylmethylidene)-5-methyl-2-oxazolidinone, etc.

In addition to the above oxazolidinones wherein hydrocarbon substituents are present on the oxazolidinone nucleus, this invention provides the class of 4-alkylidene-2-oxazolidinones carrying substituent radicals on the nitrogen atom which bear negative substituents, i. e., bromine or chlorine atoms. Exemplary of the 3-haloalkyl-substituted oxazolidinones provided by this invention are 3-(2-chloroethyl)-4-methylene-2-oxazolidinone, 3-(2-bromoethyl)-4-methylene-2-oxazolidinone, 3-trichloromethyl - 4 - isobutylidene - 2 - oxazolidinone, 3 - (2,2,2-trichloroethyl)-4-methylene-2-oxazolidinone, 3-(2,2,3-trichloropropyl) - 4 - methylene - 2 - oxazolidinone, 3-chloromethyl - 4 - ethylidene - 5 - methyl - 5 - phenyl - 2-oxazolidinone, etc. Another and particularly preferred embodiment of this invention comprises the haloaryl-substituted oxazolidinones, e. g., 3-(2-chlorophenyl)-4-methylene-2-oxazolidinone, 3-(3-chlorophenyl)-4-methylene - 2 - oxazolidinone, 3 - (2,4 - dichlorophenyl) - 4-methylene-2-oxazolidinone, 3-(2,4,5-trichlorophenyl)-4-methylene - 2 - oxazolidinone, 3 - pentachlorophenyl-4 - methylene - 2 - oxazolidinone, 3 - (4 - chlorophenyl)-4 - ethylidene - 2 - oxazolidinone, 3 - (3 - chlorophenyl)-4-methylene-5,5-dimethyl-2-oxazolidinone, 3-(3-bromophenyl) - 4 - methylene - 2 - oxazolidinone, 3 - (3 - chlorophenyl) - 4 - ethylidene - 5-cyclohexyl-2-oxazolidinone, 3 - (3,5 - dichlorophenyl) - 4 - (2 - cyclohexylethylidene)-2 - oxazolidinone, 3 - (3 - chlorobenzyl) - 4 - benzylidene - 5 - propyl - 2 - oxazolidinone, 3 - (chlorophenyl)-4 - allylidene - 5 - phenyl - 5 - methyl - 2 - oxazolidinone, 3 - (5 - chloronaphthyl) - 4 - methylene - 2 - oxazolidinone, 3 - (2 - chloro - 4 - methylphenyl) - 4 - methylene-2 - oxazolidinone, 3 - (2 - bromophenyl) - 4 - hexylidene-5 - phenethyl - 5 - methyl - 2 - oxazolidinone, 3 - (4'-chloro - 4 - biphenylyl) - 4 - undecylidene - 2 - oxazolidinone, 3 - (pentachlorobiphenylyl) - 4 - methylene - 5-nonyl - 5 - methyl - 2 - oxazolidinone, 3 - (2 - chloro-4 - isopropyl - 1 - methylcyclohexyl) - 4 - benzylidene-2-oxazolidinone, etc.

It will be noted that the above listing of the novel products of the invention has not included the products of cyclization of 1-alkynylcycloalkyl esters of carbamic acids. When such esters are cyclized in accordance with this invention, the products of the reaction are spiro compounds, of the structure

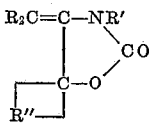

where R represents hydrogen, or a hydrocarbon radical of up to 16 carbon atoms, R' represents hydrogen or a hydrocarbon radical of up to 16 carbon atoms substituted by 0 to 5 chlorine or bromine atoms, and R" represents a bivalent radical; preferably, R" is a hydrocarbon radical which, taken together with the carbon atom to which it is attached, represents a cycloalkyl radical containing from 5 to 10 carbon atoms and wherein the alicyclic nucleus of said cycloalkyl radical is a five- to seven-membered ring. An example of such a spiro compound which may be obtained in accordance with this invention is the product of thermal cyclization of 1-ethynylcyclohexyl carbamate, which is 4-methylene-1-ox-3-azaspiro[4,5]decan-2-one, of the formula

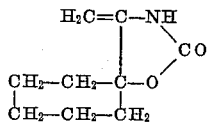

Similarly, from 1-alkynylcycloalkyl esters of carbamic acids of the presently preferred formula, may be prepared 4 - methylene - 7,7,9 - trimethyl - 1 - ox - 3 - azaspiro[4,5]decan-2-one, 3-methyl-4-methylene-1-ox-3-azaspiro[4,5]decan - 2 - one, 7,7 - dimethyl - 4 - methylene-1 - ox - 3 - azaspiro[4,4]nonan - 2 - one, 4 - ethylidene-1 - ox -3 - azaspiro[4,6]dodecan - 2 - one, 3 - phenyl-4 - methylene - 1 - ox - 3 - azaspiro[4,5]decan - 2 - one, methylene - 6,8,8 - trimethyl - 1 - ox - 3 azaspiro[4,5]-decan - 2 - one, 3 - phenyl - 4 - methylene - 7 - methyl-1 - ox - 3 - azaspiro[4,5]decan - 2 - one, 3 - phenyl - 4-methylene - 6,8,8 - trimethyl - ox - 3 - azaspiro[4,5]-decan - 2 - one, 3 - phenyl - 4 - benzylidene - 1 - ox - 3-azaspiro[4,5]decan - 2 - one, 3 - (4 - chlorophenyl)-4 - decylidene - 1 - ox - 3 - azaspiro[4,4]nonane - 2 - one, 3 - (3 - chlorophenyl) - 4 - allylidene - 8 - methyl - 1-ox - 3 - azaspiro[4,5]decan - 2 - one, 3 - (3,4 - dichlorophenyl) - 4 - methylene - 8 - methyl - 1 - ox - 3 - azaspiro[4,5]decan - 2 - one, 3 - (3 - bromophenyl) - 4-(cyclohexylmethylidene) - 7,7,9 - trimethyl - 1 - ox - 3-azaspiro[4,5]decan-2-one, etc.

It will be appreciated by skilled stereochemists that the above listed compounds are susceptible of existence in a variety of steric configurations, and that the present synthesis may produce mixtures of enantiomorphs and diasterioisomers, depending on the substitution of the starting esters. All such stereoisomers are intended to be included by the above listing of the compounds obtained in accordance with this invention, and by the appended claims.

In carrying out the process of the invention whereby the α,β-acetylenically unsaturated alcohol esters of carbamic acids are cyclized, these carbamic acid esters are simply heated at a temperature and for a time sufficient to effect cyclization of the alcohol. The esters vary greatly in the ease with which cyclization occurs. Thus, e. g., in the process of synthesizing 1,1-dimethyl-2-propynyl chlorocarbanilate by heating 1,1-dimethylpropargyl alcohol with chlorophenyl isocyanate on a steam bath for 2 hours in the presence of pyridine, followed by neutralization of the pyridine with dilute hydrochloric acid and extraction of the reaction mixture with hot hexane, I have found that the product obtained was, not the expected ester, but the cyclized product, 3-(chlorophenyl)-4-methylene-5,5-dimethyl-2-oxazolidinone. The carbanilates which are free of negative substituents are generally less reactive and may require extended gentle heating for a period of 7–8 hours or longer before undergoing cyclization. On the other hand, the presence of cyclized product has been detected by infra-red analysis in an alkylcarbamate ester of propargyl alcohol prepared from the isocyanate by a process comprising gentle heating in the presence of pyridine as described above, so that even carbamates free of negative substituents may undergo the presence cyclization process relatively readily, depending on the steric hindrance in the molecule and the freedom of the hydrogen atom attached to the nitrogen atom to migrate to the β-acetylenic carbon atom. Excessive temperatures such as temperatures of 300° C. or above are to be avoided, since high heat can lead to undesired side reactions; and instead, heating for more extended periods of time at lower temperatures such as the temperature of a steam bath is a preferred method of effecting the present cyclization.

In many instances, the present reaction is accelerated by the presence of basic catalysts. One preferred class of such catalysts includes the tertiary organic bases such as trimethylamine, N,N-dimethylaniline, or pyridine. In a preferred embodiment of the present reaction, the ester of a carbamic acid is prepared by the reaction of an acetylenic alcohol with the carbamic acid generator, i. e., urea, a carbamyl chloride, or an isocyanate, in the presence of a base; the ester may then be cyclized directly, if desired, by further heating, the base present as a catalyst for the esterification reaction functioning, as the heating is continued, to catalyze the cyclization. It will be appreciated that other basic materials may also be used in the process of the invention: for example, inorganic catalysts such as basic metal oxides, e. g., sodium hydroxide, potassium hydroxide, calcium oxide, etc., or an alkoxide thereof, such as sodium ethoxide, or an alkali metal, can be used. Organic quaternary bases such as choline hydroxide may also be utilized as basic catalysts in this process. In another embodiment of the present invention, the esters of carbamic acids useful in preparing oxazolidinones in accordance with this invention may be contacted with a solid basic catalyst, e. g., an ion exchange resin or a solid basic oxide such as alumina, to effect the cyclization. By the use of catalysts, the necessity for heating the esters to cause cyclization to proceed may be eliminated, and the cyclization may be caused to proceed at room temperature or below.

The presence of a solvent is not necessary, but solvents or diluents may conveniently be employed as a reaction medium. Generally, the acetylenic esters of carbamic acids are more soluble in organic solvents than the oxazolidinones, and the reaction medium may suitably be chosen so that the course of formation of the 4-alkylidene-2-oxazolidinones may be followed by observation of the separation of the oxazolidinones from the solution of the carbamate. Advantageously, low-boiling solvents are employed so that the reaction temperature may be controlled at the reflux temperature of the solution. Examples of suitable inert solvents are, e. g., hydrocarbons such as hexane or petroleum ether, benzene or toluene; chlorinated compounds such as ethylene dichloride or carbon tetrachloride; oxygenated solvents such as dioxane or ether; and nitrogen compounds such as dimethylformamide, etc. Advantageously, under some circumstances, an excess of an organic basic catalyst for the reaction, such as pyridine, may be utilized as the reaction medium.

Sub- and superatmospheric pressures may be applied to the ester or ester solution during the cyclization reaction if desired, but generally no advantage is gained by pressure variation.

The time required for the reaction, as pointed out above, varies greatly with the starting material and will also vary with the temperature to which the acetylenic ester is exposed, and with the presence or absence of catalyst. I have found that the occurrence of cyclization is generally accompanied by the formation of color in the reaction mixture, and this color change may conveniently be used as a gauge of the progress of the reaction. However, the oxazolidinones of themselves are essentially colorless, and it is my belief that the color formation is due to side reactions such as cleavage and aldol condensation. When the present reaction is carried out under conditions suppressing color formation, the progress of the reaction may be followed by separation of the insoluble oxazolidinones from the solution of the carbamate, by spectral analysis of the reaction mixture, etc. The oxazolidinones are generally higher melting than the carbamates, and may be also identified, if desired, by melting point. The present products are readily isolated by convenient means; in a preferred embodiment of the reaction, whereby acetylenic esters are refluxed in a low-boiling solvent, the oxazolidinone may separate as a precipitate from which the solution may be removed readily under reduced pressure, leaving the essentially pure product in a single step.

It will be appreciated that certain of the present 4-alkylidene-2-oxazolidinones, i. e., those doubly substituted on the 5 position, may also be prepared via the alternative route of my structure proof as described hereinabove, by the cyclization of a carbamate ester of a 1-acyl alcohol wherein the carbinol carbon atom is free of hydrogen. These 1-acyl alcohols may be prepared, inter alia, by hydration of an $\alpha,\beta$-acetylenic alcohol by treatment with a strong mineral acid as illustrated by the following equation:

$$R-C\equiv C-CR'_2OH \longrightarrow R-CH_2\underset{\underset{O}{\|}}{C}-CR'_2OH$$

where each R' is a hydrocarbon radical of from 1 to 16 carbon atoms, and R is hydrogen or a hydrocarbon radical of from 1 to 16 carbon atoms. The formation of the carbamate ester is then carried out by conventional means, i. e., by reaction with urea, a carbamyl chloride, or an isocyanate, after which the keto ester is cyclized by heating under dehydrating conditions, e. g., in an alcohol solution in the presence of a mineral acid or base. The cyclization reaction proceeds as illustrated by the following equation:

where R and R' are as defined hereinabove and R'' represents hydrogen or a hydrocarbon radical of from 1 to 16 carbon atoms substituted by from 0 to 5 chlorine or bromine atoms. So far as I am aware, such a synthesis has not been carried out prior to my present invention. Generally, exocyclic unsaturation is not readily obtained in chemical syntheses. While the prior art syntheses of oxazolin-5-ones, unsaturated compounds certain of which are intermediates in the synthesis of penicillins, have given exocyclic double bonds, this exocyclic unsaturation has always been in a position to be stabilized by resonance with the keto carbon atom. In the present reaction, wherein there is formed an azlactone structure, the keto carbon atom being isolated between an oxygen and a nitrogen atom, no such resonance is possible; and it is accordingly unexpected that it should be possible to carry out this reaction successfully. However, inasmuch as such a synthesis requires an additional step, hydration, as compared to my presently claimed cyclization synthesis, and does not have the wide field of applicability of my synthesis consisting of a cyclization of acetylenic alcohol esters with carbamic acids, I prefer and claim the latter synthesis.

The presently provided 4-alkylidene-2-oxazolidinones when obtained in pure form are generally solid crystalline materials. They are useful for a variety of agricultural and industrial purposes. Thus, for example, as pointed out above, the present compounds are intermediates which can be converted by hydrogenation, e. g., in the presence of Raney nickel, to the corresponding 4-substituted 2-oxazolidinones wherein the 4-substituent is saturated, these compounds being known to be useful biological toxicants, pharmaceuticals, solvents, etc. In addition, the present 4-alkylidene-2-oxazolidinones possess biological activity and are of utility as bactericides. Thus, for example, one of the compounds of the invention is incorporated in a growth medium for bacteria such as nutrient agar, at a concentration of 1 part per thousand, to inhibit the growth of Micrococcus pyogenes var. aureus throughout an incubation period of 5 days at 25° C. after the agar has been inoculated with the bacteria. Additionally, the compounds of the invention containing a halo-substituted radical on the nitrogen atom thereof are of utility as agricultural fungicides. The present 4-alkylidene-2-oxazolidinones may also be used as herbicides, insecticides, hypnotics, etc.

The invention is illustrated but not limited by the following examples:

*Example 1*

This example illustrates the cyclization of an acetylenic ester of an alkylcarbamate.

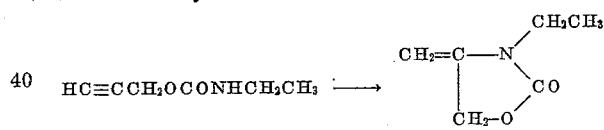

A mixture of 50 g. (0.70 mole) of ethyl isocyanate with 22.4 g. (0.40 mole) of propargyl alcohol was refluxed for two hours. Distillation gave 28.4 g. of a fraction b. 117–118° C./25 mm., $n_D^{25}$ 1.5000, the elemental analysis of which corresponded closely to the theoretical for $C_6H_9O_2N$. This product consisted of a mixture of propargyl ethylcarbamate with 3-ethyl-4-methylene-2-oxazolidinone, as shown by infrared analysis, wherein the spectrum of the product was found to contain a peak in the 13 micron region at a point corresponding to absorption by the vinylidene group.

*Example 2*

This example illustrates the cyclization of a carbanilate of a primary acetylenic alcohol.

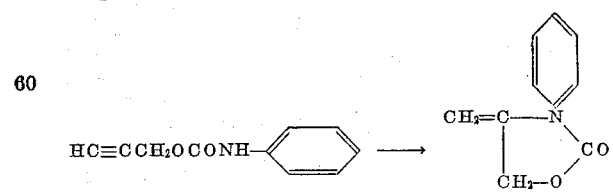

Propargyl carbanilate was prepared by mixing 25 g. of propargyl alcohol with 49 g. of phenyl isocyanate in the presence of a few drops of pyridine, the reaction mixture being stirred occasionally over a period of 2 hours at room temperature. After decolorization and recrystallization from hexane, the propargyl carbanilate obtained melted, in good agreement with the value reported in the literature, at 62.4–62.7° C.

To 40 g. (0.23 mole) of propargyl carbanilate prepared as described above were added 65 ml. of pyridine, and the mixture was refluxed for 40 hours. After cooling, the reaction mixture was drowned in water, and the resulting brown precipitate extracted with hexane. By decolorization with charcoal and repeated recrystallizations from hexane, benzene, and ethanol, 3-phenyl-4-methylene-2-oxazolidinone was isolated in 79% yield, as white crystals melting at 97.5–98° C.

Elemental analysis confirmed the expected composition of the product. A mixed melting point with the original carbanilate showed marked depression of the melting point. The oxazolidinone was compared with propargyl carbanilate by infrared analysis: the infrared spectrum of the propargyl carbanilate shows bands for acetylenic ≡CH and for the >NH group in the 3-micron region, and the carbonyl band appears in the 6-micron region at 1700 cm.$^{-1}$. The infrared spectrum for the thermal cyclization product, 3-phenyl-4-methylene-2-oxazolidinone shows no bands in the 3-micron region, indicating the absence of acetylenic carbon and the absence of amino hydrogen, and does contain a band corresponding to the vinylidene group in the 14-micron region at 695 cm.$^{-1}$. In addition, the carbonyl band in the 6-micron region is displaced to 1750 cm.$^{-1}$, indicating a strained carbonyl group, i. e., a carbonyl group within a cyclic ring rather than in a straight, freely rotating chain.

*Example 3*

This example illustrates the cyclization of a carbanilate of a tertiary acetylenic alcohol.

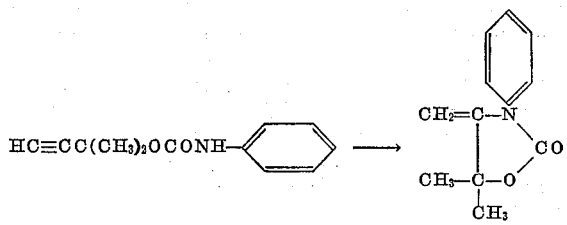

1,1-Dimethyl-2-propynyl carbanilate, m. 103.2–103.5° C., was prepared by adding 70.6 g. of 2-methyl-3-butyn-2-ol to 100 g. of phenyl isocyanate in 100 ml. of pyridine, and heating the resulting mixture on a steam bath for 2 hours. Without isolation of the carbanilate, the reaction mixture was then heated to 130° C. for 3 hours and let stand overnight. The next day, 50 g. of crystals were filtered from the hot solution and transferred to a Soxhlet extractor, where the crystals were continuously extracted with 250 ml. of hot hexane for 3 hours. By cooling and filtration of the hexane extract, there were isolated 48.5 g. of 3-phenyl-4-methylene-5,5-dimethyl-2-oxazolidinone, m. 130.2–131.5° C., mixed M. P. with 1,1-dimethyl-2-propynyl carbanilate, 84.0–96.1° C. The reaction mixture from which the 50 g. of crystals were separated was poured into 750 ml. of water, precipitating additional crude oxazolidinone product. A sample of the oxazolidinone decolorized with charcoal and purified by repeated crystallizations from hexane and ethanol was found to melt at 131.5–132° C. The identity of the product was confirmed by infrared spectral and elemental analysis.

*Example 4*

This example illustrates the cyclization of a carbanilate of a 1-alkynylcycloalkyl alcohol.

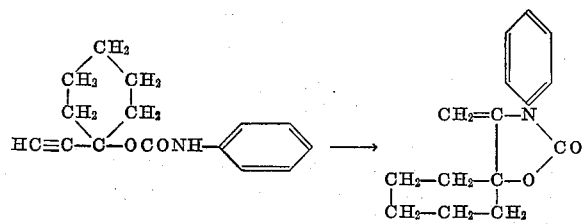

A solution of 68.5 g. of 1-ethynylcyclohexanol in 100 ml. of pyridine was added to 65.5 g. of phenyl isocyanate, and the reaction mixture was heated on a steam bath for 15 minutes, and then let stand at room temperature for 2 hours with occasional stirring. The cool reaction mixture was poured into a solution of 100 ml. of concentrated HCl in 800 ml. of water; the solid which separated was filtered off and recrystallized from hexane, giving 1-ethynylcyclohexyl carbanilate as white needles, m. 97.0–97.4° C. Fifty grams of this carbanilate were dissolved in 50 ml. of pyridine and refluxed 8 hours. The solid resulting from pouring the reaction mixture into 250 ml. of 20% HCl was decolorized with charcoal and recrystallized from hexane, whereby there was obtained 3 - phenyl - 4 - methylene - 1 - ox - 3 - azaspiro [4,5]decan-2-one, m. 168.9–170° C.

*Example 5*

This example illustrates the cyclization of an ester of an acetylenic alcohol free of acetylenic hydrogen with a halo-substituted carbanilic acid.

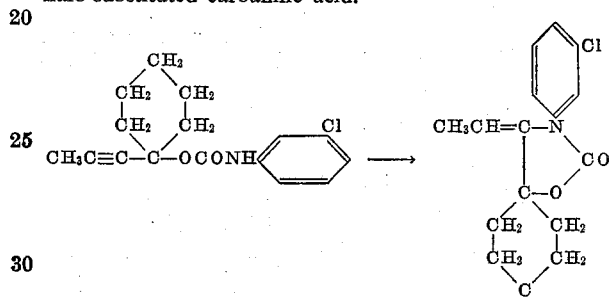

Methylacetylene was introduced into a solution of lithium in liquid ammonia, and to the resulting solution of lithium methylacetylide, diluted with ether, cyclohexanone was added, to prepare 1-(1-propynyl)cyclohexanol, m. 47° C., as described in my copending application Serial No. 580,192, filed April 24, 1956. A mixture of 90 g. of 1-(1-propynyl)cyclohexanol with 100 g. of 3-chlorophenyl isocyanate in 200 ml. of pyridine was heated on a steam bath for 15 minutes, let stand for 2 hours with occasional shaking, and poured into dilute hydrochloric acid, to precipitate out 1-(1-propynyl)cyclohexyl 3-chlorocarbanilate, m. 99.5–100.2° C. A solution of 50 g. of this chlorocarbanilate in 50 ml. of pyridine was refluxed for 8 hours and then poured into 250 ml. of 20% HCl, to give 45 g. of crude 3-(3-chlorophenyl) - 4 - ethylidene - 1 - ox - 3 - azaspiro[4,5] decan-2-one, as a sweet-smelling brown precipitate. A portion of the crude product was decolorized with charcoal and recrystallized from hexane to give a purified sample of the cyclized product in the form of white crystals, m. 150.8–151.6° C. In the infrared spectrum of the product, the ≡CH and >NH bands found in the spectrum of the chlorocarbanilate were absent, the olefinic band was present, and the carbonyl group band was displaced as compared to the chlorocarbanilate spectrum, thus corroborating the postulated structure.

*Example 6*

Similarly, 50 g. of 1-ethynylcyclohexyl 3-chlorocarbanilate, m. 119.9–120.2° C., prepared by reacting 1-ethynylcyclohexanol with 3-chlorophenyl isocyanate in pyridine at steam bath temperature for 15 minutes, was dissolved in 50 ml. of pyridine and refluxed for 8 hours, after which the reaction mixture was poured into 250 ml. of 20% HCl to precipitate 34 g. of crude product. By treatment with decolorizing charcoal and repeated crystallizations from hexane, 3 - (3 - chlorophenyl) - 4 - methylene - 1 - ox - 3 - azaspiro[4,5]decan - 2 - one was isolated as yellow platelets, m. 143.6–143.8° C.

*Example 7*

By reaction of 168 parts of 2-methyl-3-butyn-2-ol with 338 parts of 3-chlorophenyl isocyanate in the presence of 50 parts by weight of pyridine at steam bath temperature for 2 hours, followed by pouring the reaction mixture into dilute hydrochloric acid and extracting the resulting precipitate with hexane, there was obtained 1,1-dimethyl-2-propynyl 3-chlorocarbanilate, m. 106.4–107.0° C.

A flask charged with 250 ml. of hexane and 25 ml. of pyridine was connected to a Soxhlet extractor, in which was placed 140 g. of crude 1,1-dimethyl-2-propynyl 3-chlorocarbanilate. After rapid extraction for 4 hours, the hexane solution of the carbanilate was separated from the extraction apparatus, the hexane distilled off, and the remaining reaction mixture heated at 100° for 4 hours. The reddish-tan solid product was decolorized with charcoal and repeatedly recrystallized from hexane and ethanol, whereupon 3-(3-chlorophenyl)-4-methylene-5,5-dimethyl-2-oxazolidinone was obtained as white crystals, m. 102–102.5° C.

*Example 8*

This example illustrates the cyclization of an ester of an acetylenic alcohol with a polychloro-substituted carbanilate.

To 40 g. of 2-methyl-3-butyn-2-ol in 75 ml. of pyridine were added 77 g. of 3,4-dichlorophenyl isocyanate. The mixture was heated on a steam bath for 30 minutes, let stand, with intermittent shaking, for 2 hours, and then poured into 400 ml. of 20% aqueous hydrochloric acid. The resulting precipitate was decolorized with charcoal and repeatedly crystallized from hexane to give 1,1-dimethyl-2-propynyl 3,4-dichlorocarbanilate, m. 116.8–117.2° C.

Twenty-five grams of 1,1-dimethyl-2-propynyl 3,4-dichlorocarbanilate prepared as described above were dissolved in 50 ml. of pyridine and heated at about 100° C. for 8 hours. The reaction was poured into 300 ml. of 20% HCl, and the resulting precipitate decolorized with charcoal and repeatedly crystallized from ethanol and hexane. The purified 3-(3,4-dichlorophenyl)-4-methylene - 5,5 - dimethyl-2-oxazolidinone so obtained melted at 140.2–140.8° C.

*Example 9*

By procedures similar to those described above, 1-ethyl-1-methyl-2-propynyl 3,4-dichlorocarbanilate, m. 69.4–69.6° C., was prepared by reaction of 75 g. of 3,4-dichlorophenyl isocyanate with 42 g. of 3-methyl-1-pentyn-3-ol in 100 ml. of pyridine at steam bath temperature for 1 hour. Forty grams of the ester, obtained after separation from byproduct bis(dichlorophenyl) urea by recrystallization from hexane, were dissolved in 50 ml. of pyridine, and the resulting solution was refluxed for 8 hours. Treatment of the dark reaction mixture with dilute hydrochloric acid, and decolorization and recrystallization of the precipitate separating in the acidification step gave 3-(3,4-dichlorophenyl)-4-methylene-5-ethyl-5-methyl-2-oxazolidinone as white needles, m. 88.6–88.8° C.

*Example 10*

When 1-ethynylcyclohexanol was reacted with 3,4-dichlorophenyl isocyanate in pyridine, the reaction mixture being heated 15 minutes on a steam bath and let stand 2 hours with intermittent shaking, the precipitate from neutralization of the reaction mixture with hydrochloric acid was found to be partly cyclized. The dichlorocarbanilate, separated by crystallization from hexane, m. 119.7–119.9° C.; the structure of this material was confirmed by infrared analysis. The portion of the reaction product which had a wide (102–119° C.) melting point range and which represented a mixture of dichlorocarbanilate and cyclized product was dissolved in pyridine, and the solution refluxed for 8 hours. Treatment with aqueous hydrochloric acid produced a brownish precipitate of crude 3-(3,4-dichlorophenyl)-4-methylene-1-ox-3-azaspiro[4,5]-decan-2-one.

*Example 11*

This example illustrates the cyclization of an acetylenic alcohol ester with carbamic acid, wherein the substituents on the nitrogen atom are only hydrogen.

A mixture of 28 g. of propargyl alcohol and 30 g. of urea containing about 1 g. of benzenesulfonic acid as catalyst was refluxed 12 hours; ammonia was evolved during the reaction. Heating was discontinued and the reaction mixture extracted with boiling hexane; the hexane solution was evaporated to dryness on the water bath, and the resulting solid recrystallized from water, to give 12 g. of 2-propynyl carbamate, m. 43–44° C. The carbamate ester gradually cyclized on long standing at room temperature, as evidenced by discoloration of the initially water-white crystals and confirmed by infrared analysis of the discolored product.

*Example 12*

This example describes the evaluation of one of the present compounds containing a chloro-substituted nitrogen substituent as an agricultural fungicide.

Three two-week old tomato plants were immersed in a solution containing 100 p. p. m. of 3-(3,4-dichlorophenyl)-4-methylene-5-ethyl-5-methyl-2-oxazolidinone for 48 hours. The plants were then removed, the root systems washed and partially torn off, the plant roots immersed briefly in suspensions of the tomato wilt disease organism, *Fusarium lycopersici*, and the plants potted in sterile soil. At the end of the growing period, when a control plant which had not received chemical treatment but had similarly been exposed to the wilt disease organism was dead, the plants were examined; and it was found that the plants which had been treated with the oxazolidinone were in vigorous health and had been completely protected from the disease.

Similarly, there may be employed as fungicides such compounds of the invention as 3-(3,4-dichlorophenyl)-4-methylene-1-ox-3-azaspiro[4,5]decan-2-one, 3-(3-chlorophenyl)-4-methylene-5,5-dimethyl-2-oxazolidinone, etc.

While the invention has been described with reference to various particular preferred embodiments thereof, it will be appreciated that numerous modifications can be made without departing from the invention.

What is claimed is:

1. A 4-alkylidene-2-oxazolidinone of the formula

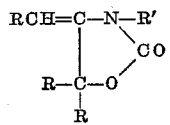

where R represents a substituent selected from the class consisting of hydrogen and hydrocarbon radicals of from 1 to 16 carbon atoms and R' represents a radical selected from the class consisting of hydrogen and hydrocarbon radicals of from 1 to 16 carbon atoms substituted by from 0 to 5 halogen atoms, said halogen atoms having an atomic weight of from 30 to 100.

2. A 4-alkylidene-2-oxazolidinone of the formula

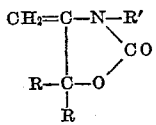

where R represents a hydrocarbon radical containing from 1 to 16 carbon atoms and R' represents a hydrocarbon radical of from 1 to 16 carbon atoms containing from 1 to 5 halogen atoms, said halogen atoms having an atomic weight of from 30 to 100.

3. A 4-alkylidene-2-oxazolidinone of the formula

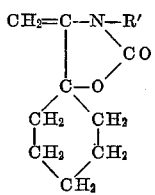

where R' represents a hydrocarbon radical containing from 1 to 16 carbon atoms and from 0 to 5 halogen atoms, said halogen atoms having an atomic weight of from 30 to 100.

4. A 4-alkylidene-2-oxazolidinone of the formula

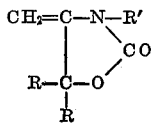

where each R represents a hydrocarbon radical containing up to 16 carbon atoms and Ar represents a hydrocarbon radical containing up to 16 carbon atoms and containing at least 1 benzene nucleus.

5. 4-methylene-2-oxazolidinone.
6. 3-phenyl-4-methylene-5,5-dimethyl-2-oxazolidinone.
7. 3-(3 - chlorophenyl) - 4 - methylene-1-ox-3-azaspiro-[4,5]decan-2-one.
8. 3-(3-chlorophenyl)-4-methylene-5,5-dimethyl-2-oxazolidinone.
9. 3-(3,4-dichlorophenyl)-4-methylene-5,5-dimethyl-2-oxazolidinone.
10. The process which comprises heating an ester of the formula

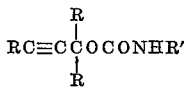

where each R represents a substituent selected from the class consisting of hydrogen and hydrocarbon radicals of from 1 to 16 carbon atoms, and R' represents a radical selected from the class consisting of hydrogen and hydrocarbon radicals of from 1 to 16 carbon atoms containing from 0 to 5 halogen atoms, said halogen atoms having an atomic weight of from 30 to 100, for a time sufficient to effect cyclization of the said ester, and isolating from the resulting reaction product a 4-alkylidene-2-oxazolidinone of the formula

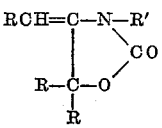

where R and R' are as defined hereinabove.

11. The process which comprises contacting an ester of the formula

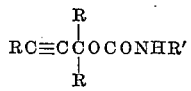

where each R represents a radical selected from the class consisting of hydrogen and hydrocarbon radicals of from 1 to 16 carbon atoms and R' represents a radical selected from the class consisting of hydrogen and hydrocarbon radicals of from 1 to 16 carbon atoms containing from 0 to 5 halogen substituents, said halogen substituents having an atomic weight of from 30 to 100, with a basic catalyst for a time sufficient to effect cyclization of the said ester, and isolating from the resulting reaction product a 4-alkylidene-2-oxazolidinone of the formula

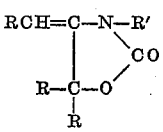

where R and R' are as defined hereinabove.

12. The process of claim 11 wherein the said ester is heated in the presence of a basic catalyst for a time sufficient to effect cyclization of the said ester.

13. The process which comprises heating propargyl carbamate with a basic catalyst for a time sufficient to effect cyclization of the said carbamate and isolating from the resulting reaction product 4-methylene-2-oxazolidinone.

14. The process which comprises heating 1,1-dimethyl-2-propynyl carbanilate with a basic catalyst for a time sufficient to effect cyclization of the said carbanilate, and isolating from the resulting reaction product 3-phenyl-4-methylene-5,5-dimethyl-2-oxazolidinone.

15. The process which comprises heating 1-ethynylcyclohexyl, 3-chlorocarbanilate with a basic catalyst for a time sufficient to effect cyclization of the said chlorocarbanilate and isolating from the resulting reaction product 3-(3-chlorophenyl)-4-methylene-1-ox-3-azaspiro[4,5]-decan-2-one.

16. The process which comprises heating 1,1-dimethyl-2-propynyl 3-chlorocarbanilate with a basic catalyst for a time sufficient to effect cyclization of the said chlorocarbanilate and isolating from the resulting reaction product 3-(3-chlorophenyl)-4-methylene-5,5-dimethyl-2-oxazolidinone.

17. The process which comprises heating 1,1-dimethyl-2-propynyl 3,4-dichlorocarbanilate with a basic catalyst for a time sufficient to effect cyclization of the said dichlorocarbanilate and isolating from the resulting reaction product 3-(3,4-dichlorophenyl)-4-methylene-5,5-dimethyl-2-oxazolidinone.

References Cited in the file of this patent
UNITED STATES PATENTS
2,399,118    Homeyer _____ Apr. 23, 1946

UNITED STATES PATENT OFFICE
CERTIFICATE OF CORRECTION

Patent No. 2,844,590                                          July 22, 1958

Margaret D. Cameron

It is hereby certified that error appears in the printed specification of the above numbered patent requiring correction and that the said Letters Patent should read as corrected below.

Column 1, line 43, for "have", second occurrence, read -- been --; column 9, line 51, for "methylene-6,8,8-trimethyl" read -- -phenyl-4-propylidene --; line 54, after "trimethyl" insert -- -1 --; column 14, line 31, in the formula, add to the lowest carbon atom of the substituted cyclohexyl group -- $H_2$ --; column 17, line 24, for "Ar" read -- R' --; line 31, for "-oza-" read -- -oxa- --.

Signed and sealed this 31st day of March 1959.

(SEAL)
Attest:

KARL H. AXLINE
Attesting Officer

ROBERT C. WATSON
Commissioner of Patents